(12) United States Patent
Lee

(10) Patent No.: US 8,446,211 B2
(45) Date of Patent: May 21, 2013

(54) INTERNAL VOLTAGE GENERATION CIRCUIT

(75) Inventor: Sang Don Lee, Icheon-si (KR)

(73) Assignee: SK Hynix Inc., Gyeonggi-do (KR)

( * ) Notice: Subject to any disclaimer, the term of this patent is extended or adjusted under 35 U.S.C. 154(b) by 0 days.

(21) Appl. No.: 13/187,621

(22) Filed: Jul. 21, 2011

(65) Prior Publication Data

US 2012/0274380 A1 Nov. 1, 2012

(30) Foreign Application Priority Data

Apr. 27, 2011 (KR) .................... 10-2011-0039471

(51) Int. Cl.
*G05F 1/10* (2006.01)

(52) U.S. Cl.
USPC .................................. 327/536; 363/60

(58) Field of Classification Search
USPC ....................... 327/536; 363/59–60
See application file for complete search history.

(56) References Cited

U.S. PATENT DOCUMENTS

| | | | | |
|---|---|---|---|---|
| 5,796,296 A * | 8/1998 | Krzentz | ................ | 327/545 |
| 6,018,264 A * | 1/2000 | Jin | ................ | 327/536 |
| 6,091,282 A * | 7/2000 | Kim | ................ | 327/536 |
| 6,259,612 B1 * | 7/2001 | Itoh | ................ | 363/60 |
| 6,927,620 B2 * | 8/2005 | Senda | ................ | 327/536 |
| 7,358,778 B2 * | 4/2008 | Kato et al. | ................ | 327/77 |
| 7,453,312 B2 * | 11/2008 | Lin et al. | ................ | 327/535 |
| 7,554,311 B2 * | 6/2009 | Pan | ................ | 323/285 |
| 7,902,907 B2 * | 3/2011 | Tanzawa | ................ | 327/536 |
| 8,120,411 B1 * | 2/2012 | Liu et al. | ................ | 327/536 |

FOREIGN PATENT DOCUMENTS

| KR | 1020070051970 A | 5/2007 |
|---|---|---|
| KR | 1020070100060 A | 10/2007 |
| KR | 100897295 B1 | 5/2009 |
| KR | 1020090097482 A | 9/2009 |

* cited by examiner

*Primary Examiner* — Thomas J Hiltunen

(74) *Attorney, Agent, or Firm* — William Park & Associates Patent Ltd.

(57) ABSTRACT

An internal voltage generation circuit includes a first detection unit, a second detection unit, a control unit, and a voltage pumping unit. The first detection unit compares an internal voltage with a first reference voltage to generate a first detection signal when the first detection unit is activated in response to a first enable signal. The second detection unit compares the internal voltage with a second reference voltage to generate a second detection signal. The control unit generates the first enable signal and a second enable signal in response to the first detection signal and the second detection signal. The voltage pumping unit generates the internal voltage in response to the second enable signal.

28 Claims, 2 Drawing Sheets

INTERNAL VOLTAGE GENERATION CIRCUIT

CROSS-REFERENCES TO RELATED APPLICATION

The present application claims priority under 35 U.S.C. §119(a) to Korean application number 10-2011-0039471, filed on Apr. 27, 2011 in the Korean Intellectual Property Office, and which is incorporated herein by reference in its entirety.

BACKGROUND

1. Technical Field

The present invention relates to an internal voltage generation circuit, and more particularly, to an internal voltage generation circuit for generating an internal voltage with a desired level from a power supply voltage.

2. Related Art

An electronic circuit operates with a power supply voltage, and generally generates an internal voltage with a desired level from the power supply voltage. The electronic circuit drives internal circuits using the internal voltage. Specifically, since a semiconductor apparatus of the electronic circuit is very sensitive to a voltage level, the electronic circuit generates internal voltages with various levels from the power supply voltage for various circuitry that requires different voltage levels.

FIG. 1 is a diagram illustrating an example of an internal voltage generation circuit according to the known art. In FIG. 1, the internal voltage generation circuit includes a detection unit 10 and a voltage pumping unit 20. The detection unit 10 detects a level of an internal voltage VINT reduced through voltage division and compares it to the voltage reference signal VREF to appropriately generate a pump enable signal PUMPEN. The voltage pumping unit 20 performs charge pumping in response to the pump enable signal PUMPEN to generate the internal voltage VINT. The voltage division is generally performed using a resistor, wherein the resistance of the resistor should not be very large in order to improve a sensing response speed of the detection unit 10. When the resistance of the resistor is set to be very small in order to increase a response speed, since the response speed of the detection unit 10 is too fast, ripples may occur in the internal voltage VINT and the consumption of a current for generating the internal voltage VINT is increased. Accordingly, a trade-off relationship is established between the sensing response speed of the detection unit 10 and the frequency of occurrence of ripples of the internal voltage VINT. Furthermore, using resistors to divide a voltage to generate the internal voltage VINT results in continuous current consumption.

SUMMARY

An internal voltage generation circuit capable of quickly generating an internal voltage with a desired level while reducing ripples is described herein.

In one embodiment of the present invention, an internal voltage generation circuit includes a first detection unit configured to compare an internal voltage with a first reference voltage and generate a first detection signal when the first detection unit is activated in response to a first enable signal. A second detection unit is configured to compare the internal voltage with a second reference voltage and generate a second detection signal. A control unit is configured to generate the first enable signal and a second enable signal in response to the first detection signal and the second detection signal. A voltage pumping unit is configured to generate the internal voltage in response to the second enable signal.

In another embodiment of the present invention, an internal voltage generation circuit includes a first detection unit configured to compare an internal voltage with a first reference voltage and generate a second enable signal when the first detection unit is activated in response to a first enable signal. A second detection unit is configured to substantially maintain a level of the internal voltage when the internal voltage is changed to a first level, and compare the internal voltage with a second reference voltage to generate the first enable signal when the internal voltage is changed to a second level larger than the first level. A voltage pumping unit is configured to generate the internal voltage in response to the second enable signal.

In another embodiment of the present invention, an internal voltage generation circuit includes a first detection unit including a first voltage division section that receives an internal voltage with a first load, and is configured to compare the internal voltage with a first reference voltage and generate a second enable signal when the first detection unit is activated in response to a first enable signal. A second detection unit, which includes a second voltage division section that receives the internal voltage with a second load larger than the first load, is configured to compare the internal voltage with a second reference voltage and generate the first enable signal. A voltage pumping unit is configured to generate the internal voltage in response to the second enable signal.

BRIEF DESCRIPTION OF THE DRAWINGS

Features, aspects, and embodiments are described in conjunction with the attached drawings, in which.

DETAILED DESCRIPTION

An internal voltage generation circuit according to the present invention is described in detail with reference to the accompanying drawings through exemplary embodiments.

Figure 1:
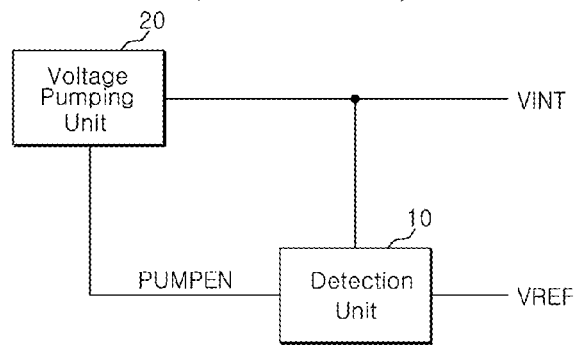
FIG. 1 is a block diagram illustrating configuration of an internal voltage generation circuit according to the known art.
Figure 2:
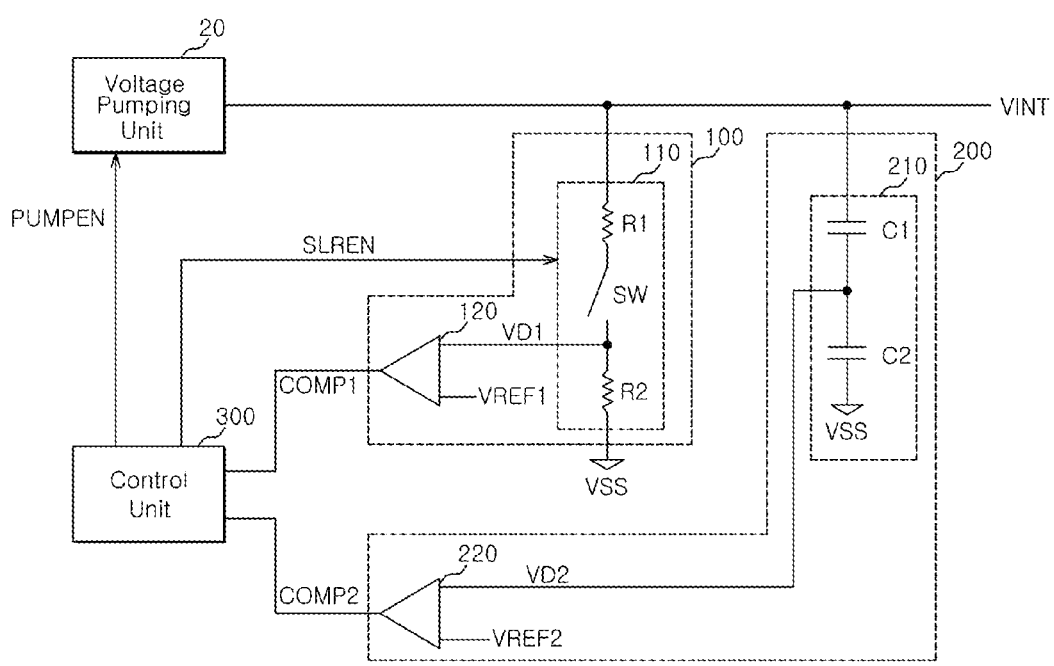
FIG. 2 is a diagram illustrating an internal voltage generation circuit according to an embodiment of the invention.

FIG. 2 is a diagram illustrating the configuration of an internal voltage generation circuit 1 according to an embodiment of the invention. In FIG. 2, the internal voltage generation circuit 1 includes a first detection unit 100, a second detection unit 200, a control unit 300, and a voltage pumping unit 20. In order to effectively explain various embodiments, the first detection unit 100, the second detection unit 200, and the control unit 300 are illustrated as separate elements. However, the control unit 300 may be included in one of the first detection unit 100 and the second detection unit 200. Other embodiments may also combine the functionalities of the first detection unit 100, the second detection unit 200, the control unit 300, and the voltage pumping unit 20 in various configurations.

The first detection unit 100 is configured to be activated in response to a first enable signal SLREN. When the first detection unit 100 is activated in response to the first enable signal SLREN, the first detection unit 100 compares an internal voltage VINT with a first reference voltage VREF1 to assert a first detection signal COMP1. The first detection signal COMP1 may be provided as a second enable signal PUMPEN to the voltage pumping unit 20. When the first detection unit 100 is deactivated in response to the first enable signal SLREN, the first detection unit 100 does not substantially consume current.

The first detection unit 100 includes a first voltage division section 110. The first voltage division section 110 is configured to receive the internal voltage VINT and has a first load comprising, for example, a resistive element R1 and a resistive element R2, with a switching element SW between the two resistors. The first voltage division section 110 is configured to divide the internal voltage VINT to generate a first division voltage VD1.

The second detection unit 200 is configured to compare the internal voltage VINT with a second reference voltage VREF2 and generate a second detection signal COMP2. The second detection signal COMP2 may be provided as the first enable signal SLREN. The second detection unit 200 can compare the internal voltage VINT with the second reference voltage VREF2 and activate the first detection unit 100 according to a comparison result. When the level of the internal voltage VINT is changed to a first level, the second detection unit 200 maintains the level of the internal voltage VINT. When the level of the internal voltage VINT is changed to a second level larger than the first level, the second detection unit 200 asserts the second detection signal COMP2.

The second detection unit 200 includes a second voltage division section 210. The second voltage division section 210 is configured to receive the internal voltage VINT and has a second load comprising, for example, a first capacitive element C1 and a second capacitive element C2. The second voltage division section 210 is configured to divide the internal voltage VINT to generate a second division voltage VD2.

In an embodiment of the invention, the second load of the second voltage division section 210 is larger than the first load of the first voltage division section 110. Thus, the total load of the second detection unit 200 is larger than the total load of the first detection unit 100. For example, the first load may comprise resistive elements and the second load may comprise capacitive elements. Consequently, when the level of the internal voltage VINT is changed to the first level, the second detection unit 200 can substantially maintain the level of the internal voltage VINT using the capacitive elements C1 and C2. When the level of the internal voltage VINT is changed to the second level, that is, when the level of the internal voltage VINT is changed beyond the voltage the capacitive elements C1 and C2 substantially maintain the level of the internal voltage VINT, the second detection unit 200 asserts the second detection signal COMP2.

When the level of the internal voltage VINT is finely changed, the internal voltage generation circuit 1 substantially maintains the level of the internal voltage VINT through the second voltage division section 210 of the second detection unit 200. When the level of the internal voltage VINT is significantly changed, the internal voltage generation circuit 1 can generate the second detection signal (COMP2 or the first enable signal SLREN) that activates the first detection unit 100. The first detection signal COMP1 is provided as the second enable signal PUMPEN by the control unit 300, which will be described later, and the second detection signal COMP2 is provided as the first enable signal SLREN by the control unit 300. As described above, since the control unit 300 may be included in the first detection unit 100 or the second detection unit 200, the first detection signal COMP1 and the second enable signal PUMPEN may be used as signals which have substantially the same meaning or function, and the second detection signal COMP2 and the first enable signal SLREN may be used as signals which have substantially the same meaning or function in the following detailed description.

The first reference voltage VREF1 may be received from outside the internal voltage generation circuit 1, and may have a voltage level that depends on a division ratio of the first voltage division section 110. The second reference voltage VREF2 may also be received from the outside the internal voltage generation circuit 1, and may have a voltage level that depends on a division ratio of the second voltage division section 210. The first reference voltage VREF1 and the second reference voltage VREF2 may have, for example, a value corresponding to half of a target level of the internal voltage VINT. The first reference voltage VREF1 may have substantially the same level as that of the second reference voltage VREF2, or the first reference voltage VREF1 may have a level higher than that of the second reference voltage VREF2. When the first reference voltage VREF1 and the second reference voltage VREF2 are set as described above, the second detection unit 200 can generate the second detection signal COMP2 to activate the first detection unit 100, and adjust the time for which the first detection unit 100 is activated and operates.

The control unit 300 may be, for example, configured to generate the first enable signal SLREN and the second enable signal PUMPEN in response to the first detection signal COMP1 and the second detection signal COMP2, respectively. When the first detection signal COMP1 is asserted, the control unit 300 asserts the second enable signal PUMPEN. When the second detection signal COMP2 is asserted, the control unit 300 asserts the first enable signal SLREN and substantially maintains the activation state of the first enable signal SLREN. When the number of times by which the first detection signal COMP1 is asserted reaches a predetermined number, the control unit 300 may deassert the first enable signal SLREN. Since the first detection unit 100 has a load smaller than that of the second detection unit 200, ripples may occur in the level of the internal voltage VINT generated by the operation of the first detection unit 100. Consequently, when the first detection unit 100 operates a predetermined number of times, the control unit 300 can deactivate the first detection unit 100 and allow the level of the internal voltage VINT to be substantially maintained by the second detection unit 200.

The voltage pumping unit 20 is configured to generate the internal voltage VINT in response to the second enable signal PUMPEN. The voltage pumping unit 20 is a general pumping circuit and performs a pumping operation to generate the internal voltage VINT from a power supply voltage (not illustrated) when the second enable signal PUMPEN is asserted. The internal voltage VINT may have a level of a low voltage lower than a low voltage of the power supply voltage as a target level, or have a level of a high voltage higher than a high voltage of the power supply voltage as the target level. Consequently, the voltage pumping unit 20 can increase or decrease the level of the internal voltage VINT to the target level in response to the second enable signal PUMPEN. For ease of description, it is assumed that the internal voltage VINT is a high voltage.

In FIG. 2, the first detection unit 100 includes the first voltage division section 110 and a first comparison section 120. The first voltage division section 110 includes a first resistive element R1, a second resistive element R2, and a switch SW. The first resistive element R1 and the second resistive element R2 are serially connected to each other between a ground voltage VSS and a node at which the internal voltage VINT is generated. The switch SW is configured to control an electrical connection between the first resistive element R1 and the second resistive element R2. When the first enable signal SLREN is asserted, the switch SW is turned on to electrically connect the first resistive element R1 to the second resistive element R2. When the first enable signal SLREN is deasserted, the switch SW is turned off to interrupt the electrical connection between the first resistive element R1 and the second resistive element R2. When the switch SW is turned off and the electrical connection between the first resistive element R1 and the second resistive element R2 is interrupted, since a current path from the node at which the internal voltage VINT is generated to the ground voltage VSS is interrupted, the first detection unit 100 does not consume current. The first division voltage VD1 is generated by the voltage divider network formed by the first resistive element R1 and the second resistive element R2. One or both of the first resistive element R1 and the second resistive element R2 may be, for example, a variable resistive element for adjusting the level of the first division voltage VD1.

The first comparison section 120 is configured to compare the first division voltage VD1 with the first reference voltage VREF1 and generate the first detection signal COMP1. When the level of the first division voltage VD1 is lower than that of the first reference voltage VREF1, the first comparison section 120 asserts the first detection signal COMP1. When the level of the first division voltage VD1 is higher than that of the first reference voltage VREF1, the first comparison section 120 deasserts the first detection signal COMP1.

In FIG. 2, the second detection unit 200 includes the second voltage division section 210 and a second comparison section 220. The second voltage division section 210 includes a first capacitive element C1 and a second capacitive element C2. The first capacitive element C1 and the second capacitive element C2 are serially connected to each other between the ground voltage VSS and the node at which the internal voltage VINT is generated. The second division voltage VD2 is generated between the first capacitive element C1 and the second capacitive element C2. One or both of the first capacitive element C1 and the second capacitive element C2 may be, for example, a variable capacitive element for adjusting the level of the second division voltage VD2. The second voltage division section 210 can substantially and stably maintain the internal voltage VINT according to the capacity of the first capacitive element C1 and the second capacitive element C2. Consequently, the second voltage division section 210 can generate the second division voltage VD2 while substantially maintaining the level of the internal voltage VINT.

The second comparison section 220 is configured to compare the second division voltage VD2 with the second reference voltage VREF2 and generate the second detection signal COMP2. When the level of the second division voltage VD2 is lower than that of the second reference voltage VREF2, the second comparison section 220 asserts the second detection signal COMP2. When the level of the second division voltage VD2 is higher than that of the second reference voltage VREF2, the second comparison section 220 deasserts the second detection signal COMP2.

Figure 3:
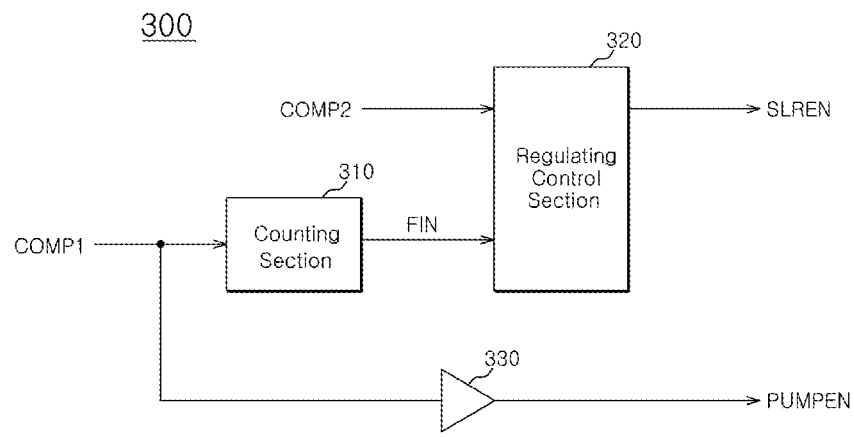
FIG. 3 is a block diagram illustrating a control unit illustrated in FIG. 2 according to an embodiment of the invention.

FIG. 3 is a block diagram illustrating the configuration of the control unit 300 illustrated in FIG. 2 according to an embodiment of the invention. In FIG. 3, the control unit 300 includes a counting section 310 and a regulating control section 320. The counting section 310 is configured to count the number of times the first detection signal COMP1 is asserted, and generate a completion signal FIN when the number of times the first detection signal COMP1 is asserted reaches a predetermined number. The counting section 310, for example, may include a 2-bit counter capable of counting up to four times the first detection signal COMP1 is asserted. When the counting section 310 reaches the predetermined number that the first detection signal COMP1 is asserted, four, in this case, the counting section 310 asserts the completion signal FIN.

The regulating control section 320 is configured to receive the second detection signal COMP2 and the completion signal FIN and generate the first enable signal SLREN. When the second detection signal COMP2 is asserted, the regulating control section 320 asserts the first enable signal SLREN and substantially maintains the activation state of the first enable signal SLREN. When the completion signal FIN is asserted, the regulating control section 320 deasserts the first enable signal SLREN. The regulating control section 320, for example, may include an RS flip-flop that receives the second detection signal COMP2 through a set terminal and receives the completion signal FIN through a reset terminal.

Furthermore, the first detection signal COMP1 is provided as the second enable signal PUMPEN, and the control unit 300 may further include a buffer section 330 configured to buffer the first detection signal COMP1 and output the second enable signal PUMPEN. As described above, the whole or a part of the control unit 300 may be included in one or both of the first detection unit 100 and the second detection unit 200. For example, the counting section 310 of the control unit 300 may be included in the first detection unit 100, and the regulating control section 320 may be included in the second detection unit 200.

Figure 4:
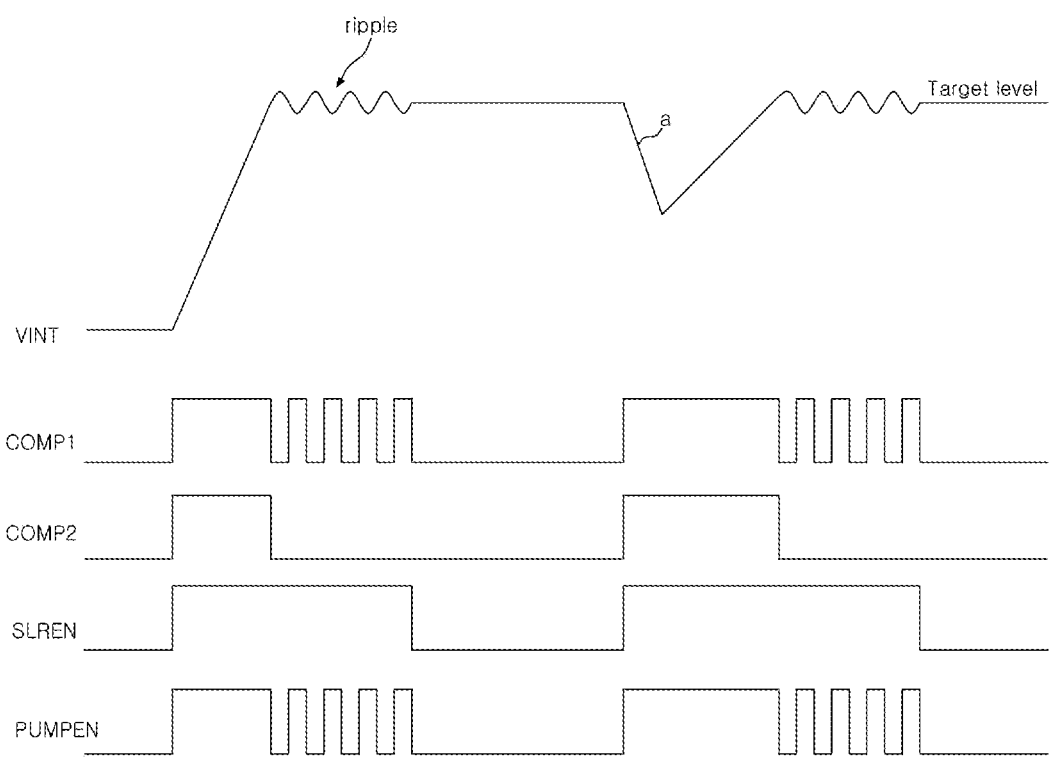
FIG. 4 is a timing diagram illustrating the operation of an internal voltage generation circuit according to an embodiment of the invention.

FIG. 4 is a timing diagram illustrating the operation of the internal voltage generation circuit 1 according to an embodiment of the invention. The operation of the internal voltage generation circuit 1 according to an embodiment of the invention will be described with reference to FIGS. 2 to 4 below. When the internal voltage generation circuit 1 starts to operate, the second detection unit 200 asserts the second detection signal COMP2. The control unit 300 asserts the first enable signal SLREN in response to the second detection signal COMP2 and substantially maintains the activation state of the first enable signal SLREN. When the first enable signal SLREN is asserted, the first detection unit 100 is activated. The first detection unit 100 asserts the first detection signal COMP1 until the internal voltage VINT reaches the target level. The second enable signal PUMPEN is asserted according to the first detection signal COMP1, and the voltage pumping unit 20 increases the level of the internal voltage VINT in response to the second enable signal PUMPEN.

When the level of the internal voltage VINT reaches substantially the target level, the first detection signal COMP1 generated by the first detection unit 100 is repeatedly asserted and deasserted, and ripples occur in the level of the internal voltage VINT. That is, when the level of the internal voltage VINT is above the target level, the first detection signal COMP1 is deasserted, and thus the level of the internal voltage VINT is slightly reduced below the target level. The first detection unit 100 then asserts the first detection signal COMP1 again, and the level of the internal voltage VINT is increased above the target level. As described above, while the first detection signal COMP1 is repeatedly asserted and deasserted, ripples occur in the level of the internal voltage VINT. In this regard, when the ripples occur four times, that is, when the first detection signal COMP1 is asserted four times, the control unit 300 asserts the completion signal FIN to deassert the first enable signal SLREN. As the first enable signal SLREN is deasserted, the first detection unit 100 is deactivated. Since the second voltage division section 210 including the capacitive elements is sufficiently charged with the level of the internal voltage VINT, it is possible to substantially maintain the level of the internal voltage VINT even if the first detection unit 100 does not further assert the first detection signal COMP1 in order to increase the level of the internal voltage VINT. Consequently, the internal voltage generation circuit 1 according to an embodiment of the invention can substantially and stably the level of the internal voltage VINT while reducing current consumption caused by ripples and current consumption occurring in the first voltage division section 110 of the first detection unit 100.

When the number of times by which the internal voltage VINT is used in another circuit is increased or the amplitude of the internal voltage VINT is increased, the level of the internal voltage VINT may be rapidly reduced as illustrated in the portion of FIG. 4 labeled as 'a'. When the internal voltage VINT is rapidly reduced and the level of the internal voltage VINT is not substantially maintained, the second detection unit 200 asserts the second detection signal COMP2. As the second detection signal COMP2 is asserted, the first enable signal SLREN is asserted to activate the first detection unit 100, so that the first detection unit 100 asserts the first detection signal COMP1 to allow the level of the internal voltage VINT to increase up to the target level again by the voltage pumping unit 20. When the internal voltage VINT sufficiently increases up to the target level, the first detection signal COMP1 is repeatedly asserted and deasserted. When the first detection signal COMP1 is asserted, for example, four times, since the first enable signal SLREN is deasserted, the first detection unit 100 is deactivated again. The second detection unit 200 substantially maintains the internal voltage VINT with the target level as long as the level of the internal voltage VINT is not rapidly changed.

While certain embodiments have been described above, it will be understood to those skilled in the art that the embodiments described are by way of example only. Accordingly, the internal voltage generation circuit described herein should not be limited based on the described embodiments. Rather, the internal voltage generation circuit described herein should only be limited in light of the claims that follow when taken in conjunction with the above description and accompanying drawings.

What is claimed is:

1. An internal voltage generation circuit comprising:
   a first detection unit configured to compare an internal voltage with a first reference voltage and generate a first detection signal when the first detection unit is activated in response to a first enable signal;
   a second detection unit configured to compare the internal voltage with a second reference voltage and generate a second detection signal;
   a control unit configured to generate the first enable signal and a second enable signal in response to the first detection signal and the second detection signal, and to deassert the first enable signal when the first detection signal is asserted a predetermined number of times; and
   a voltage pumping unit configured to generate the internal voltage in response to the second enable signal.

2. The internal voltage generation circuit according to claim 1, wherein the first detection unit comprises:
   a first voltage division section configured to form a current path in response to the first enable signal and divide the internal voltage to generate a first division voltage; and
   a first comparison section configured to compare the first division voltage with the first reference voltage and generate the first detection signal.

3. The internal voltage generation circuit according to claim 2, wherein the first voltage division section comprises:
   a first resistive element connected to a node at which the internal voltage is generated;
   a second resistive element connected to a ground voltage node; and
   a switch configured to electrically connect the first resistive element and the second resistive element to each other in response to the first enable signal,
   wherein the first division voltage is generated between the first resistive element and the second resistive element.

4. The internal voltage generation circuit according to claim 1, wherein the second detection unit is configured to substantially maintain a level of the internal voltage when the internal voltage is changed to a first level, and assert the second detection signal when the internal voltage is changed to a second level larger than the first level.

5. The internal voltage generation circuit according to claim 1, wherein the second detection unit comprises:
   a second voltage division section configured to divide the internal voltage to generate a second division voltage; and
   a second comparison section configured to compare the second division voltage with the second reference voltage and generate the second detection signal.

6. The internal voltage generation circuit according to claim 5, wherein the second voltage division section comprises:
   two capacitive elements serially connected to each other between a node at which the internal voltage is generated and a ground voltage,
   wherein the second division voltage is generated between the two capacitive elements.

7. The internal voltage generation circuit according to claim 1, wherein a level of the first reference voltage is equal to or higher than a level of the second reference voltage.

8. The internal voltage generation circuit according to claim 1, wherein the control unit is configured to assert the first enable signal and substantially maintain an asserted state of the first enable signal when the second detection signal is asserted.

9. The internal voltage generation circuit according to claim 8, wherein the control unit is configured to assert the second enable signal when the first detection signal is asserted.

10. The internal voltage generation circuit according to claim 1, wherein the control unit comprises:
    a counting section configured to receive the first detection signal and assert a completion signal when the first detection signal is asserted a predetermined number of times; and
    a regulating control section configured to assert the first enable signal and substantially maintain an asserted state of the first enable signal when the second detection signal is asserted, and deassert the first enable signal when the completion signal is asserted,
    wherein the first detection signal is provided as the second enable signal.

11. The internal voltage generation circuit according to claim 10, wherein the control unit further comprises:
    a buffer section configured to buffer the first detection signal and output the second enable signal.

12. An internal voltage generation circuit comprising:
a first detection unit configured to compare an internal voltage with a first reference voltage, generate a second enable signal when the first detection unit is activated in response to a first enable signal and generate a completion signal when the second enable signal is asserted a predetermined number of times;
a second detection unit configured to substantially maintain a level of the internal voltage when the internal voltage is changed to a first level, compare the internal voltage with a second reference voltage to generate the first enable signal when the internal voltage is changed to a second level larger than the first level, and deassert the first enable signal in response to the completion signal; and
a voltage pumping unit configured to generate the internal voltage in response to the second enable signal.

13. The internal voltage generation circuit according to claim 12, wherein the first detection unit comprises:
a first voltage division section configured to form a current path in response to the first enable signal and divide the internal voltage to generate a first division voltage; and
a first comparison section configured to compare the first division voltage with the first reference voltage and generate a first detection signal,
wherein the first detection signal is provided as the second enable signal.

14. The internal voltage generation circuit according to claim 13, wherein the first voltage division section comprises:
a first resistive element connected to a node at which the internal voltage is generated;
a second resistive element connected to a ground voltage node; and
a switch configured to electrically connect the first resistive element and the second resistive element to each other in response to the first enable signal,
wherein the first division voltage is generated between the first resistive element and the second resistive element.

15. The internal voltage generation circuit according to claim 13, wherein the first detection unit further comprises:
a buffer section configured to buffer the first detection signal and output the second enable signal.

16. The internal voltage generation circuit according to claim 13, wherein the first detection unit further comprises:
a counting section configured to count a number of times the first detection signal is asserted and assert the completion signal when the first detection signal is asserted a predetermined number of times.

17. The internal voltage generation circuit according to claim 16, wherein the second detection unit comprises:
a second voltage division section configured to divide the internal voltage to generate a second division voltage; and
a second comparison section configured to compare the second division voltage with the second reference voltage and generate a second detection signal,
wherein the second detection signal is provided as the first enable signal.

18. The internal voltage generation circuit according to claim 17, wherein the second detection unit further comprises:
a regulating control section configured to assert the first enable signal and substantially maintain an asserted state of the first enable signal when the second detection signal is asserted, and deassert the first enable signal when the completion signal is asserted.

19. The internal voltage generation circuit according to claim 17, wherein the second voltage division section comprises:
two capacitive elements serially connected to each other between a node at which the internal voltage is generated and a ground voltage,
wherein the second division voltage is generated between the two capacitive elements.

20. The internal voltage generation circuit according to claim 12, wherein a level of the first reference voltage is equal to or higher than a level of the second reference voltage.

21. An internal voltage generation circuit comprising:
a first detection unit including a first voltage division section that receives an internal voltage with a first load, and configured to compare the internal voltage with a first reference voltage and generate a second enable signal when the first detection unit is activated in response to a first enable signal;
a second detection unit including a second voltage division section that receives the internal voltage with a second load larger than the first load, and configured to compare the internal voltage with a second reference voltage and generate the first enable signal; and
a voltage pumping unit configured to generate the internal voltage in response to the second enable signal,
wherein one of the first detection unit and the second detection unit further comprises a control unit configured to deassert the first enable signal when the second enable signal is asserted a predetermined number of times.

22. The internal voltage generation circuit according to claim 21, wherein the first voltage division section includes a resistive element and is configured to generate a first division voltage from the internal voltage.

23. The internal voltage generation circuit according to claim 22, wherein the first detection unit further comprises:
a first comparison section configured to compare the first division voltage with the first reference voltage and generate the first detection signal,
wherein the first detection signal is provided as the second enable signal.

24. The internal voltage generation circuit according to claim 23, wherein the second voltage division section includes a capacitive element and is configured to generate a second division voltage from the internal voltage.

25. The internal voltage generation circuit according to claim 24, wherein the second detection unit further comprises:
a second comparison section configured to compare the second division voltage with the second reference voltage and generate the second detection signal,
wherein the second detection signal is provided as the first enable signal.

26. The internal voltage generation circuit according to claim 25, wherein the control unit is configured to assert the first enable signal and substantially maintain an asserted state of the first enable signal when the second detection signal is asserted, and deassert the first enable signal when the first detection signal is asserted a predetermined number of times.

27. The internal voltage generation circuit according to claim 26, wherein the control unit comprises:
a counting section configured to count a number of times the first detection signal is asserted and generate a completion signal when the first detection signal is asserted the predetermined number of times; and
a regulating control section configured to assert the first enable signal when the second detection signal is asserted, and deassert the first enable signal when the completion signal is asserted.

28. The internal voltage generation circuit according to claim 21, wherein a level of the first reference voltage is equal to or higher than a level of the second reference voltage.

* * * * *